United States Patent [19]
Thornton

[11] Patent Number: 4,571,628
[45] Date of Patent: Feb. 18, 1986

[54] PORTABLE VIDEO VIEWING ASSEMBLY

[76] Inventor: Thirstol Thornton, 13431 SW. 102 La., Miami, Fla. 33186

[21] Appl. No.: 592,944

[22] Filed: Mar. 23, 1984

[51] Int. Cl.⁴ .................. H04N 5/335; H04N 5/76; H04N 9/30
[52] U.S. Cl. ............................. 358/224; 358/61; 358/88; 358/210; 358/250; 358/335; 358/906
[58] Field of Search ............... 358/224, 210, 250, 88, 358/60, 61, 335, 906

[56] References Cited

U.S. PATENT DOCUMENTS

| | | | |
|---|---|---|---|
| 2,955,156 | 10/1960 | Helig | 358/88 |
| 3,833,758 | 9/1974 | Ferrari | 358/224 |
| 4,443,819 | 4/1984 | Funada | 358/250 |
| 4,450,487 | 5/1984 | Koide | 358/210 |
| 4,496,981 | 1/1985 | Ota | 358/224 |

Primary Examiner—Howard W. Britton
Attorney, Agent, or Firm—John C. Malloy

[57] ABSTRACT

The present invention is directed towards a portable video viewing mechanism comprising a housing generally in the form of a binocular configuration being dimensioned and configured to be hand-held and manually directed towards a predetermined field of viewing. An adjustable object lens assembly observes the predetermined field of viewing and additional processing assemblies converts the resulting visual image into electrical video signals which are transferred to a remotely located video recorder which in turn transfers the process signal back to a liquid crystal display specifically dimensioned for mounting within the portable housing along independent lines of sight of the viewing assembly. Remote control means may serve to operate the video recorder so as to accomplish selective and substantially concurrent playback of the previously recorded field of vision selectively observed by the object lens assembly wherein such replay may be reviewed on the liquid crystal display structure within the housing.

7 Claims, 4 Drawing Figures

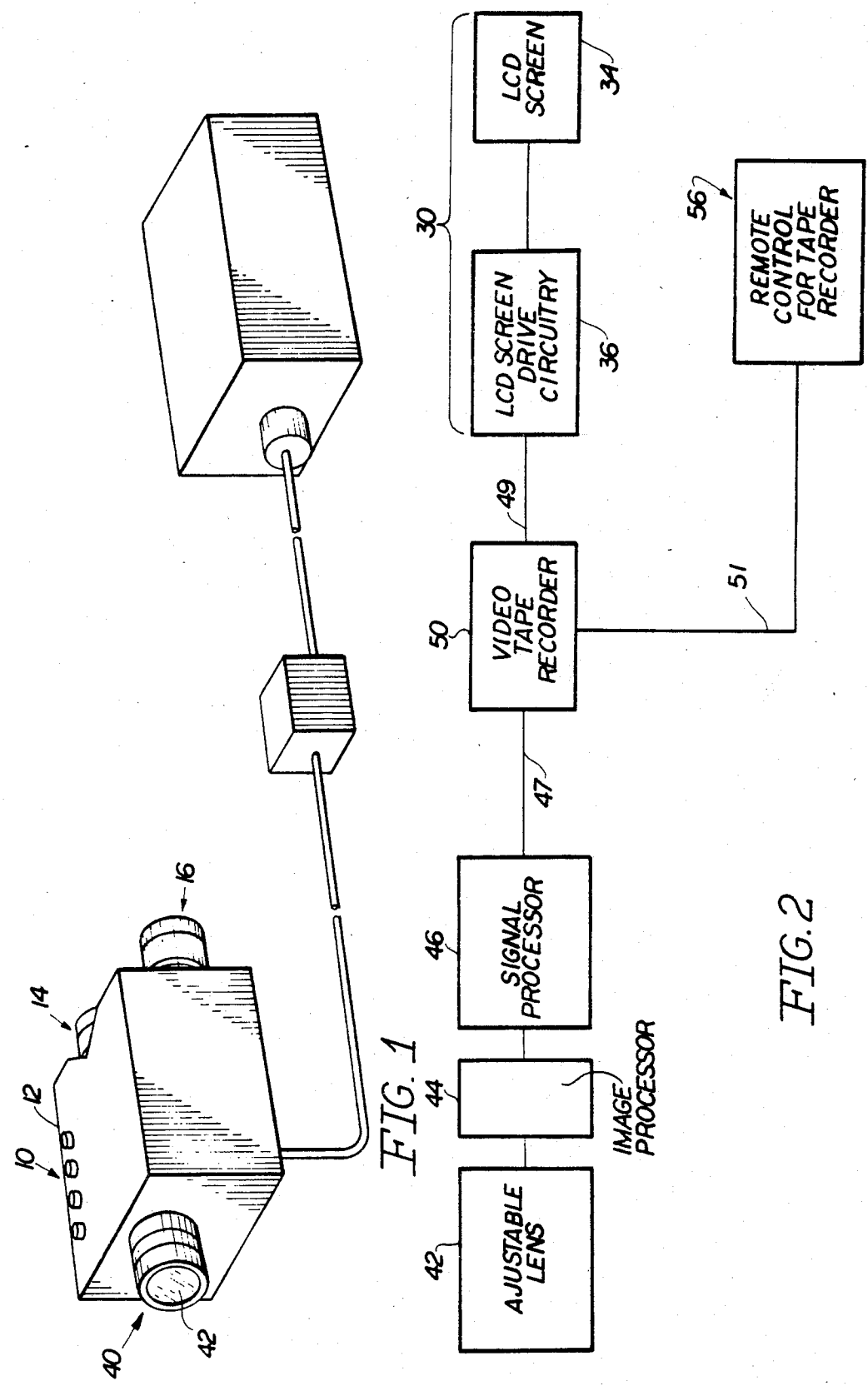

PORTABLE VIDEO VIEWING ASSEMBLY

BACKGROUND OF THE INVENTION

1. Field of the Invention

A portably structured, hand-held video viewing and playback mechanism which is structured and capable of instantaneously recording a field of vision and selectively providing playback and visual observation of the recorded field of vision wherein instantaneous playback features can be utilized during an event while the event is being recorded.

2. Description of the Prior Art

Modern technology has made possible great advances in the field of video processing, display and recording. Relatively small video cameras are now structured so as to be effectively portable and carried by a single cameraman and transferred back to a control area for broadcasting. Also, in the area of video recording, instantaneous playbacks or the substantially instantaneous replay of recorded events is commonplace and is widely used especially when broadcasting and viewing sporting events.

However, modern technology has recently advanced even further to the point where miniaturized circuitry coupled with the advent of liquid crystal display technology enables the production and commercial availability of video viewing apparatus which is generally the size of a large wrist watch.

With the existence of such modern technology, the present invention is directed towards a portable video viewing and recording mechanism which is specifically structured to allow viewing of a field of vision, such as a sporting event or the like, the recording of such field of vision (sporting event, etc.) and the substantially instantaneous or concurrent playback of such recorded event selectively by the user of the mechanism while the event is occurring. The preferred mechanism, due to the aforementioned technological advances, which are now commercially available, may be hand-held and take the overall configuration and dimension generally similar to a binocular housing wherein a substantially conventional video recorder mechanism may also be carried by the user of the mechanism but remote from the mechanism such as slung over the shoulder or carried on other appropriate harnass, etc.

SUMMARY OF THE INVENTION

The present invention is directed towards a video viewing and recording mechanism which is specifically dimensioned and configured to be hand-held and has the general overall shape and appearance of a binocular housing.

An object lens is located at the frontmost portion of the housing means or generally in an area where a predetermined field of vision can be observed and viewed by the objective lens. Processing means including an image processor and an interconnected signal processing means are specifically disposed and structured to receive the visual image from the object lens which may be adjustable, and convert that image into an electrical video signal. The video signal is then further processed by the signal processing means into a standardized synchronized coded signal. Such standard synchronized code is representative of video signals being broadcast throughout the United States. However, the signal processor can of course be modified to correspond to the conversion of video signals into standard synchronized coded signals of any geographical location such as out of the country.

A video tape recorder is located remotely from the housing means of the present invention but is of sufficient size and dimension, and of the type generally commercially available, to be carried on or with the user of the subject mechanism. The video signal is received by the video tape recorder through proper electrical interface and upon amplification transferred back to the housing means and specifically to a video screen means.

An important feature of the present invention is the video screen means being in the form of a liquid crystal display assembly including appropriate drive circuitry associated therewith. This liquid crystal display means is of the size to be mounted within the aforementioned housing means and is of the type disclosed in *Electronics International Publication,* dated May 31, 1983 (pages 85–86). More specifically, the type of liquid crystal display assembly utilized is generally of the type manufactured by Suwa Seikosha Co., of Suwa, Japan. The liquid crystal display is driven by arrays of polysilicon thin-film field-effect transistors disposed adjacent to individual picture element electrodes on a high temperature glass substrate. The 240-by-240 pixel mosaic occupies most of the 43.2-by-32.4 micrometer display which has a 2.13 inch diagonal. The pixel electrodes, gate and data lines and the counter-electrode are made of transparent indium tin oxide. The color unit operates in a transmissive mode with backlighting by diffused light from a small fluorescent lamp. Individual red, green, or blue filters, above each pixel electrode in the color display reduce effective resolution to 138 pixels in each direction. The display includes LCD panels with liquid crystal cells sandwiched between polarizers. The lower substrate carries a thin film FET array and pixel electrodes. A common counterelectrode is disposed above the cell cavity which is filled with liquid crystal material.

A viewing assembly including binocular type viewing having independent viewing sub-assemblies for each eye of the user establishes independent line of sight through independent reflective assemblies so as to view the liquid crystal display means. Also, a dispersion lens means is disposed immediately adjacent and in substantially overlying relation to the front surface of the LCD means so as to accomplish dispersion of the resulting visual display in clear visual communication with both independent lines of sight from the separate visual sub-assemblies.

A remote control facility is electrically interconnected to the video recorder so as to operate the recorder in the play, rewind, and record modes as desired by the user of the mechanism.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which:

FIG. 1 is an isometric representation of the video recording and playback mechanism coupled to a vide recorder through proper electrical interface means.

FIG. 2 is a schematic representation and flow chart showing the processing of the visual image into an electrical video signal and conversion of the video signal into a visual display utilizing the liquid crystal display assembly.

Like figures refer to like parts throughout the several views of the drawings.

Figure 3:
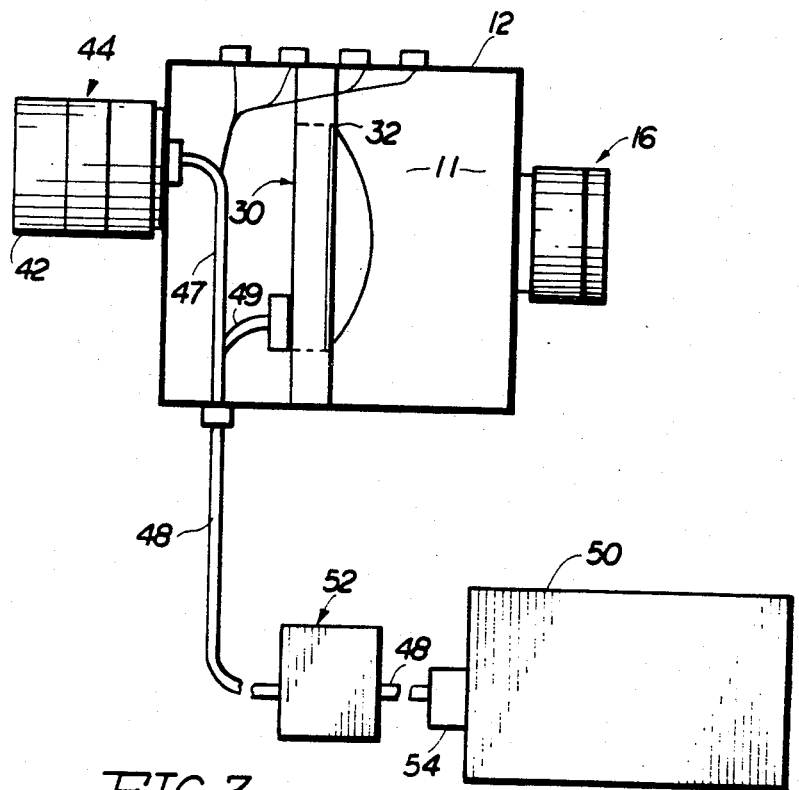
FIG. 3 is a side view showing interior structural features and relative positioning of the various components of the mechanism.
Figure 4:
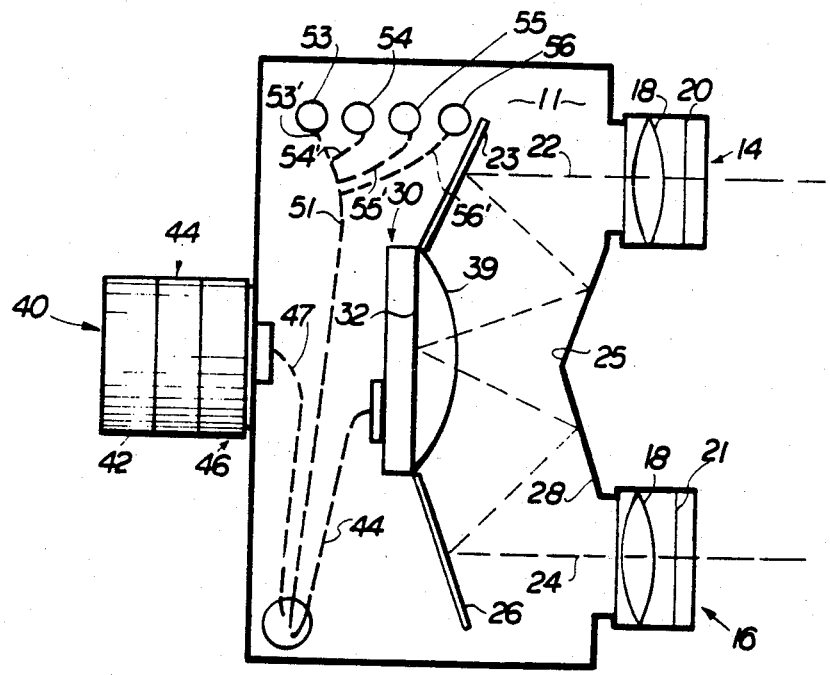
FIG. 4 is a top view of the embodiment of FIG. 3 showing the interior of the housing and representing the various components in substantially schematic form.

DETAILED DESCRIPTION OF THE PREFERRED EMBODIMENT:

The present invention is directed towards a video viewing and recording mechanism generally indicated as 10 and including a housing means 12. The housing means 12 is dimensioned and configured to be essentially hand-held and viewed through and operated similar to a binocular housing or configuration. A viewing assembly (see FIGS. 1, 3 and 4) includes independent viewing sub-assemblies 14 and 16 each including a lens element 18 viewable through appropriate and adjustable eye apertures 20 and 21 respectively. Each sub-assembly 14 and 16 is specifically structured and disposed to view into the interior 11 of the housing and establish independent lines of sight 22 and 24.

These individual lines of sight are further defined by reflection means comprising two angularly oriented and specifically arranged reflector elements or mirrors 23, 25 and 26, 28 respectively. These individual lines of sight 22 and 24 are oriented to provide independent and clear viewing of a video screen means 30 and more specifically, a visual display projected on an exposed surface thereof 32 to be explained in greater detail hereinafter.

An object lens is generally indicated at 40 and includes a lens element 42 which is adjustable so as to attain proper focus on a predetermined field of vision. The field of vision may be selected by the user of the mechanism and include any of a variety of events such as sporting events or the like.

An image processor means is generally indicated as 44 and is associated in direct visual receiving and communicating relation with the adjustable object lens 42. The image processor is structured to convert the visual images received by the object lens 42 into electrical video signals. The signals are then transmitted directly to a signal processing means 46 which is structured to convert the electrical video signal into the standard syndicated coded signal utilized in the United States for video transmission. Obviously the signal processor could be modified so as to convert the received electrical video signal from the image processor means into a standard synchronized coded signal of any given country for transmission as desired.

This converted signal is then transferred through conductor 47 to a conventional and portably structured video recorder 50. The conductor 47 along with other conductors to be described hereinafter are positioned to be housed within a conductor sheath 48. An electronic interface generally indicated as 52 is provided to receive the various conductors and signals being transferred over such conductors and interface such signals for reception by and transmission from the video recorder 50 in any substantially conventional fashion. A connecting jack or proper intake connection as at 54 is provided for proper interconnection in a conventional fashion.

Conductor 49 is interconnected through interface 52 and housed within conductor sheath 48 and serves to transmit the recorded signal from the video recorder 50 back to the video screen means previously mentioned and generally indicated as 30. The video screen means 30 comprises a liquid crystal display 34 including liquid crystal display drive circuitry 36 associated therewith and structured to electronically communicate with and receive the signal from the video tape recorder 50 through conductor 49. More specifically, the liquid crystal display means 30 may be of the type disclosed above and manufactured by Suwa Seikosha Co. of Suwa, Japan. In addition and as stated above, the size of the screen is such as to be capable of being mounted within a hand-held housing 10 wherein the display screen itself is approximately two inches in diagonal producing a substantially 43.2-by-32.4 micrometer display. As set forth above, the liquid crystal display means is specifically structured to convert the electrical video signal received from the video recorder into a projected visual display. Further structural features of the subject invention include the provision of a dispersion lens means 39 having a substantially convex outer surface. The lens 39 is disposed in overlying substantially flush or immediately adjacent relation to the display surface 32 of the video screen means 30. The placement of this dispersion lens means allows projection of the created visual display in visual communication with both independent lines of sight 22 and 24 of the viewing sub-assemblies 14 and 16.

Further structural features of the present invention includes the provision of a remote control assembly comprising individual activating buttons 53, 54, 55, and 56 for appropriate switching (not shown) wherein the switching communicates with the video recorder 50 through conductor 51 also housed within conductor sheath 48 and interconnected to the recorder through electronic interface 52. The individual activating buttons 53, 54 and 55 are structured to cause activation by switch condutors 53', 54', and 55' respectively so as to selectively activate the recorder in a play mode, rewind mode and record mode as desired respectively, dependent on the function which the user wishes the mechanism to perform. Button 56 and switch conductor 56' may serve as an on/off switch.

It is therefore to be understood that the following claims are intended to cover all of the generic and specific features of the invention herein described, and all statements of the scope of the invention which as a matter of language might be said to fall therebetween.

Now that the invention has been described,

What is claimed is:

1. A portable video viewing mechanism of the type primarily designed for instant video viewing and selective substantially concurrent playback, said viewing mechanism comprising:

(a) housing means being of portable dimension and configuration and including a viewing assembly structured to provide viewing by a user into the interior of said housing means, (b) an object lens assembly mounted on said housing means in spaced relation to said viewing assembly and disposed and structured for selective observation of a predetermined field of viewing, (c) image processor means including a video camera structured to convert visual images into electrical video signals and render said electrical video signals capable of additional processing, (d) signal processing means electrically interconnected to said image processor means and structured to process video signals into standard, synchronized coded signals, (e) video recorder means electrically interconnected to said signal processing means and located remotely from said housing means, (f) video screen means mounted within said housing in electrical communication with said video recorder means and structured to receive video signals therefrom and convert said signals into visual display within said housing means, said video screen means comprising liquid crystal display means disposed in interruptive relation to said line of sight viewing defined at least in part by said viewing assembly, (g) said viewing assembly comprising a dispersion lens means disposed in visually projecting relation to a visual display projected from said liquid crystal display means and structured to disperse said visual display in full and complete communication with said viewing assembly, (h) said dispersion lens means being disposed in overlying, immediately adjacent relation to said liquid crystal display means and comprising a convex configuration structured to project said visual image over said line of sight of said viewing assembly on the interior of said housing means, (i) said viewing assembly comprising independent viewing sub-assemblies structured to define independent lines of sight from the separate eyes of the user of said viewing mechanism, and each of said viewing sub-assemblies including a lens element and independent reflection means disposed to at least partially define said independent lines of sight extending between said separate lens elements of each viewing sub-assembly and said liquid crystal display means, (j) control means including circuitry means structured to selectively regulate, transfer and conversion of electrical video signals into visual image display on said liquid crystal display means, whereby a user may instantaneously observe said predetermined field of viewing as visual display on said liquid crystal display means and selectively view substantially concurrent replay of said observed field of viewing.

2. A mechanism as in claim 1 wherein said video screen means comprises a color projecting liquid crystal display means.

3. A mechanism as in claim 1 wherein said housing means comprises a binocular configuration and structure, said independent lens elements of each viewing sub-assembly being adjustably structured to regulate viewing therethrough.

4. A mechanism as in claim 1 wherein said object lens assembly is adjustably mounted on said housing means to selectively regulate visual observation therethrough.

5. A mechanism as in claim 1 further comprising remote control means mounted on said housing means and electrically interconnected to said video recorder means and structured to selectively control, rewind, play and record modes of said video recorder means.

6. A mechanism as in claim 5 further comprising an electrical interface mounted between said signal processor means and said video recorder means and between said video recorder means and said liquid crystal display means.

7. A portable video viewing mechanism of the type primarily designed for instant video viewing and selective substantially concurrent playback, said viewing mechanism comprising:

(a) housing means being dimensioned and configured so as to be hand-held and ambulatory with the user and including a viewing assembly structured to provide viewing of a user into the interior of said housing means, (b) said viewing assembly including separate and independent viewing sub-assemblies each including a lens element positioned and structured to allow independent viewing of each eye of the user along independent lines of sight, (c) an object lens assembly mounted on said housing means and disposed adjacent a front portion thereof and further structured for selective observation of a predetermined field of viewing, (d) image processor means including a video camera positioned in communicating relation to said object lens means and structured to convert visual images into electrical signals capable of additional electronic processing, (e) signal processing means electrically interconnected to said image processor means and structured to additionally process electrical video signals received from said image processor means and convert said electrical video signals into standard, synchronized coded signals, (f) video recorder means electrically interconnected to said signal processing means and disposed remote from said housing means, (g) video screen means comprising a liquid crystal display assembly mounted within said housing means in electrical communication with said video recorder means so as to receive video signals therefrom and structured to convert said video signals into visual display, said liquid crystal display means disposed within said housing in visual communication with said independent viewing sub-assemblies along said independent lines of sight, and (h) control means including circuitry means structured to selectively transfer and convert said electrical video signals into visual display on said liquid crystal display means, whereby a user may instantaneously observe said predetermined field of viewing as visual display on said liquid crystal display means within said housing means and selectively view substantially concurrent replay of said observed field of viewing.

* * * * *